Sheet 1-2 Sheets
G. F. Wright.
Hoop Skirt Machine.
N° 49957  Fig. 1  Patented Sep. 12, 1865.
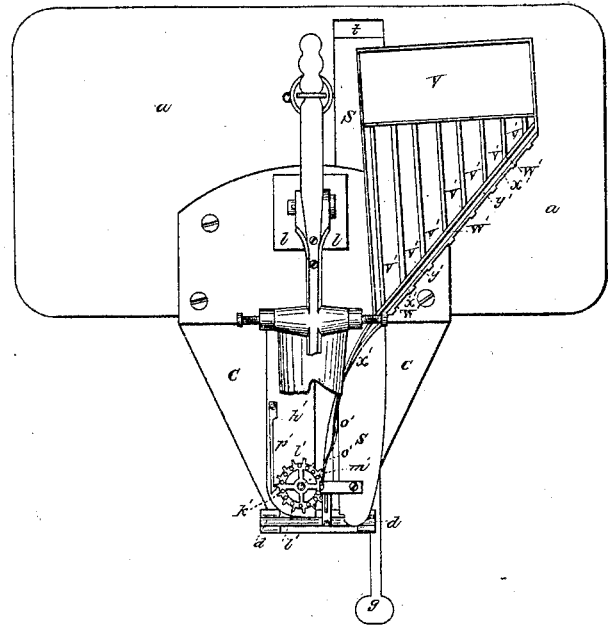
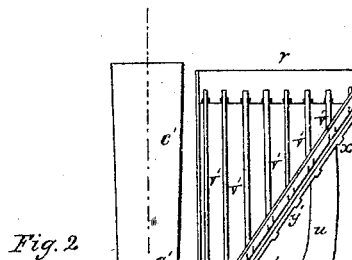
Fig. 2
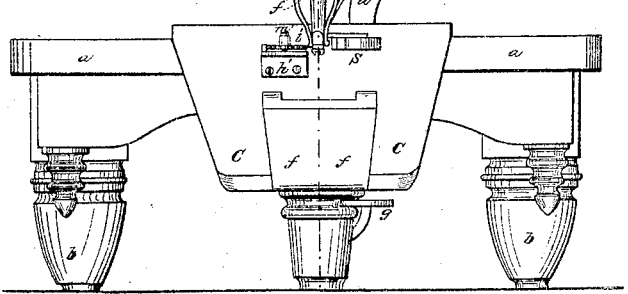
Witnesses  Inventor

G. F. Wright.
Hoop Skirt Machine.
№ 49957.        Patented Sep. 12, 1865.
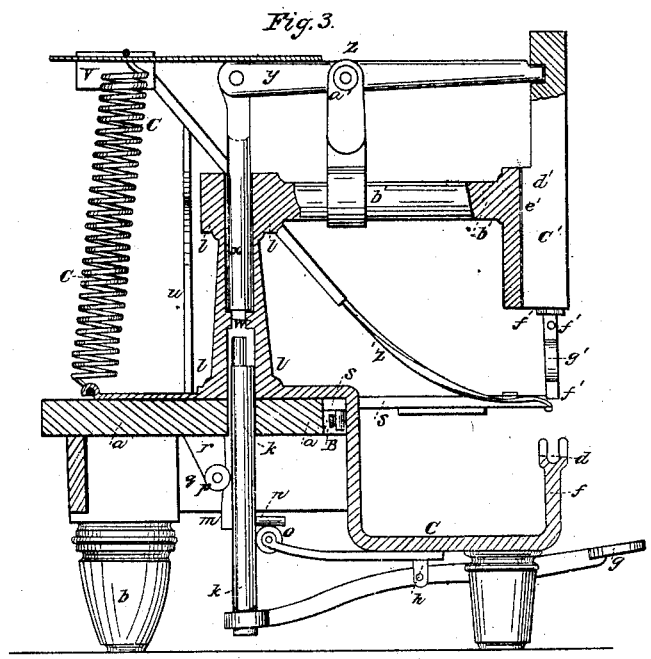
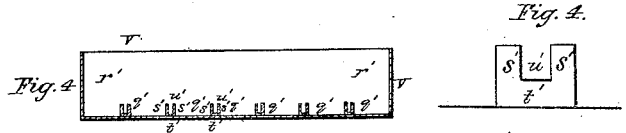
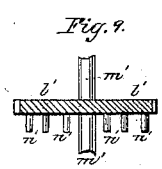
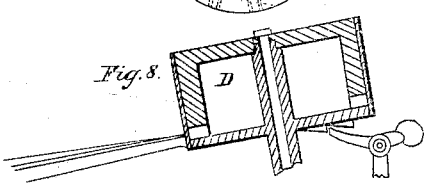

UNITED STATES PATENT OFFICE.

GEORGE F. WRIGHT, OF CLINTON, MASSACHUSETTS, ASSIGNOR TO HIMSELF AND H. H. WATERS, OF SAME PLACE.

IMPROVEMENT IN APPARATUS FOR CLINCHING CLASPS ON HOOP-SKIRTS.

Specification forming part of Letters Patent No. 49,957, dated September 12, 1865.

*To all whom it may concern:*

Be it known that I, GEORGE F. WRIGHT, of Clinton, in the county of Worcester and State of Massachusetts, have invented new and useful Improvements in Machines for Clinching Clasps upon Skirt-Hoops; and I do hereby declare that the following is a full, clear, and exact description thereof, which will enable others skilled in the art to make and use the same, reference being had to the accompanying drawings, forming a part of this specification.

The present invention relates to certain new and useful improvements in machines for setting and clinching clasps upon skirt-hoops; and it consists, first, in the use of a novel and peculiar constructed hopper, so arranged and operated as to cause the clasps placed therein to be delivered through a suitable connecting and delivery tube, one by one, to the setting or clinching tool used; second, in an arrangement of devices placed at the delivery end of said clasp-tube for feeding each clasp in turn to the clinching-tool; third, in the use of bow or other suitable springs, so placed upon the end of the clinching-tool as at the proper times to seize each clasp in turn and firmly hold the same while being carried to and placed upon the skirt-hoop, as will be presently described.

There are also other improvements in the detail construction and arrangement of the present machine, which will be hereinafter particularly described.

In the accompanying plates of drawings I have represented my improvements, reference be had to the same in the following description, of which—

Figure 1, Plate 1, is a plan or top view; Fig. 2, an end view; and in Plate 2, Fig. 3, a central longitudinal vertical section; Figs. 4, 5, 6, and 7, and 8, and 9, detail views, to be hereinafter referred to.

$a\ a$ represent a stand or bed-plate, supported on legs $b\ b$, projecting from one side of which is the plate $c$, having a groove, $d$, in the upper end of its vertical plate, $f$, in which groove the skirt-hoop to be clasped is placed, said groove being in the same vertical plane as the play of the clinching-tool used, as will be described.

$g\ g$ represent a treadle, turning on a fulcrum at $h$ of the plate $c$ and extending under the same; and bed-plate $a$ has attached to its inner end, by a pivot-joint or in any other suitable manner, a vertical rod, $k$, extending upward through bed-plate $a$ into hollow vertical standard $l$ of same. On one side of rod $k$ is a fixed cam-surface, $m$, and on the other a fixed pin, $n$, which strikes against and rests on projecting roller $o$ of plate $c$, to limit the downward movement of said rod $k$. Bearing on cam-surface $m$ is a friction-roller, $p$, placed in the lower end, $q$, of a vertical bar, $r$, attached to a horizontal bar, $s$, extending across and moving in a groove or way, $t$, of bed-plate $a$. To upper surface of bar $s$ an upright rod, $u$, is fastened, the upper portion of said rod being attached to the hopper $v\ v$, in which the clasps are placed, said hopper being arranged and constructed in a novel and peculiar manner, as will be hereinafter specified.

In same vertical plane with rod $k$, and playing in hollow standard $l$, but above the same, and with a short space, $w$, between the two, is another vertical shaft, $x$, the upper end of which is hung to the shorter arm, $y$, of a horizontal lever, $z$, turning on a fulcrum, $a'$, in the right-angular projecting arm $b'$ of post $l$. To the other end of lever $z$ a vertical bar, $c'$, is hung, having on its rear surface, $d'$, a tenon, $e'$, moving in and guided by a groove, $f'$, in arm $b'$.

In lower end of bar $c^x$ the clinching-tool $f^2$ is set and fastened by a screw, $g'$, or other proper means, the said tool $f^2$ and its bar $c'$ playing in the same vertical plane as the groove $d$, as hereinbefore referred to. On two sides of clinching-tool $f^2$, and opposite to each other, are fastened bow or any other suitable shaped springs $g^2\ g^2$, extending below lower end of said tool $f^2$, between and by which the clasps used to be fastened on the skirt-hoop are in turn grasped and held, as will be described.

$h'$ is a horizontal bar projecting from bed-plate $a$ toward clinching-tool $f^2$, having on its outer end, $k'$, a horizontal feeding-tooth wheel, $l'$, playing on a pinion, $m'$. On under surface of tooth-wheel $l'$ are a series of projecting pins, $n'\ n'\ n'$, &c., (see Fig. 9,) with which engages a spring-pawl, $o'$, fastened to vibrating bar $s$, before referred to, a pawl, $p'$, of fixed bar $h'$ engaging with its teeth.

The hopper $v\ v$ is made of a square or any other desired shape, and has a series of vertical openings, $q'\ q'\ q'$, of any desired number, arranged in the side $r'$ thereof. These openings are of the form represented in Fig. 4, Plate 2— that is, with two parallel vertical slots, $s'$ $s'$, connected together with a horizontal slot, $b'$, the lower edge of which is flush with inner surface of bottom plate of hopper $v$, thus forming a tongue, $u'$, in each opening $q'$ $q'$; $v'$ $v'$ $v'$, a series of parallel inclined guide-bars, fastened at upper ends to said tongues $u'$ $u'$ and at the lower ends to a cross inclined transverse plate, $w'$, secured at each end to a bottom plate, $x'$, placed parallel to the inclination of and under the bars $v'$ $v'$ $v'$, &c., with a small space between them. The plate $w'$ has openings similar to those described for hopper-plate $r'$ to the inclined groove $y'$, said groove $y'$ communicating at its lower end with an inclined spiral-twisted tube, $z'$, attached at or near its lower end to the vibrating bar before referred to, but projecting therefrom and running parallel thereto, so as to bring its outer end in proper position for the feed-wheel $l'$ and clinching-tool.

The twisted tube for its whole length is open at the center of one of its sides, as partially seen at A in Fig. 2, Plate 1.

Having described the manner in which the devices composing my machine are arranged, I will now proceed to describe how the same operate together.

Pressing down the outer end of the treadle $g$ by the foot, or in any other proper manner, in passing over friction-roller of horizontal bar the vertical rod $k$ is raised, and its cam-surface, $s$, moves said bar backward from the clinching-tool, thus shaking the hopper $v$, containing the clasps, and finally, reaching the lower end of the rod $x$, raises the same, which causes the bar $c'$, holding the clinching-tool, to be moved downward and into the clinching-groove $d$. The foot then being withdrawn from the treadle, the horizontal bar $s$ and clinching-tool bar $x$ are forced back to their original positions, the bar $s$ again shaking the hopper, by means of springs B and $c$, respectively, bearing on bar $s$ and hung to lever-bar $z$, when the treadle can be again pressed down, and so on; but by shaking the hopper $v$ as described it causes the clasps contained therein, the form of one of which is seen in Fig. 5, Plate 2, to gradually work their way out of the same, passing through the apertures $q'$ and down the guiding-bars $v'$, necessarily with their points up, into the groove $y'$, from whence they pass into and through the spiral guiding or connecting tube $z'$, down nearly to the end thereof, said clasps while passing through the guiding-tube being, from its spiral direction and form, turned over, so that their points are down before they reach its end. These clasps are then taken in their turn by the toothed feeding-wheel, with the points of which the teeth engage as it is intermittently revolved and operated through its pawls $o'$ and $p'$ by the forward movement of the bar described, and passed to the outer end of the tube in proper position to be grasped by and between the bow-springs of the clinching-tool as it moves by the same, and thereby carried and fastened to the skirt-hoop.

From the above description it will be seen that by my improved machine I not only automatically feed the clasps to the clinching device, but by positive motion, which has never before been accomplished. Also, it is evident that, in lieu of forming the hopper in a square shape and operated as described, a rotary hopper, D, (see Figs. 7 and 8,) may be used, properly intermittently rotated by means of any suitable arrangement of devices, and provided with the peculiar-shaped apertures, guiding-bars, and spirally-formed tube, arranged together as described; and therefore I do not intend in my claims to limit myself to any particular means for shaking or operating the hopper, as there are many various ways other than that described by which it can be accomplished; and it is also further evident that by forming a groove in the spiral or any other suitable connecting and delivery tube, as described, the clogging of the same from dirt or dust is prevented, which is also a great advantage.

Having thus described my invention, I claim as new and desire to secure by Letters Patent—

1. A vibrating hopper having apertures in the side or sides thereof of the form substantially as herein described, in combination with one or more suitable guiding-bars and a spiral or any other suitable shaped delivery tube or tubes, arranged together and operated substantially as and for the purposes specified.

2. The bow or other suitable springs $g'$ $g'$, attached to the clinching-tool for grasping the clasps, arranged and operating as described.

3. The toothed feeding-wheel $l'$, for feeding the clasps as they are delivered by the tube to the clinching-tool, arranged and operating as described.

4. The sliding bar $s$, with hopper and feeding-tube attached, arranged and operating substantially as described.

GEORGE F. WRIGHT.

Witnesses:
  C. H. WATERS,
  S. BELYEA.